United States Patent [19]
Sheridon et al.

[11] Patent Number: 6,137,467
[45] Date of Patent: Oct. 24, 2000

[54] OPTICALLY SENSITIVE ELECTRIC PAPER

[75] Inventors: Nicholas K. Sheridon, Los Altos; Edward A. Richley, Palo Alto, both of Calif.

[73] Assignee: Xerox Corporation, Stamford, Conn.

[21] Appl. No.: 08/368,133

[22] Filed: Jan. 3, 1995

[51] Int. Cl.[7] .................................. G09G 3/34
[52] U.S. Cl. .................. 345/107; 345/173; 345/179; 345/84
[58] Field of Search .................. 345/107, 105, 345/106, 173, 175, 176, 179, 182, 183, 84, 85; 178/18, 19; 264/4, 5, 7, 8

[56] References Cited

U.S. PATENT DOCUMENTS

| | | | |
|---|---|---|---|
| 4,126,854 | 11/1978 | Sheridon | 345/107 |
| 4,143,103 | 3/1979 | Sheridon | 264/4 |
| 4,405,921 | 9/1983 | Mukaiyama | 345/182 |
| 5,262,098 | 11/1993 | Crowley et al. | 264/8 |

FOREIGN PATENT DOCUMENTS

| | | | |
|---|---|---|---|
| 52-42094 | 4/1977 | Japan | 345/107 |

*Primary Examiner*—Xiao Wu
*Attorney, Agent, or Firm*—Robert Cunha

[57] ABSTRACT

An improved electric paper which allows it to form an image from a light image rather than from an applied electric field. The prior art embodiment had a number of rotatable balls imbedded in a plastic substrate. Each ball had hemispheres that had different electrical characteristics, and were colored differently. Under the influence of an image in the form of an electrical field, the balls would selectively rotate to form a permanent visible image, whereupon the field could be removed. This invention has two conductive surfaces to provide a uniform electric field across the substrate, and then exposes the substrate to light which selectively changes the electrical characteristics of one of the two hemispheres, resulting in the rotation of the selected balls to form the image.

8 Claims, 4 Drawing Sheets

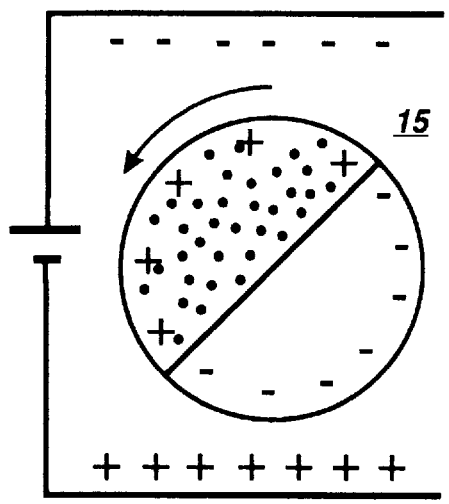
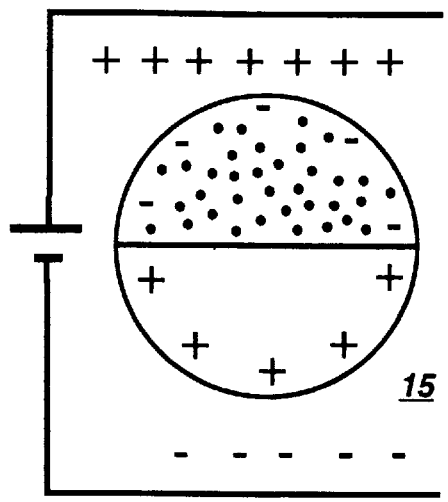
FIG. 4  FIG. 5
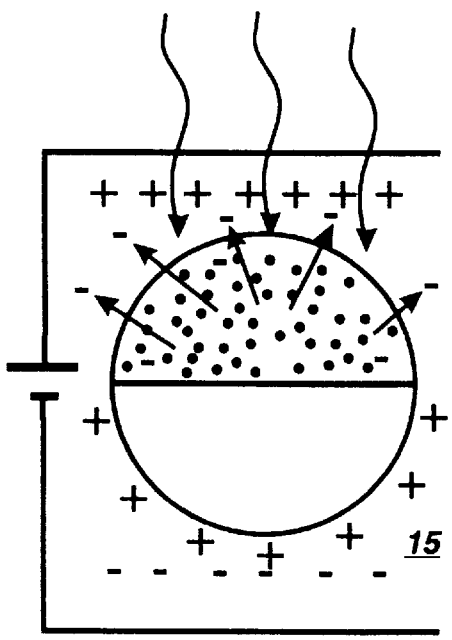
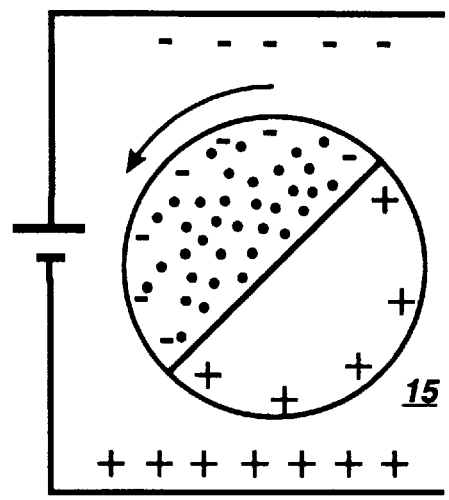
FIG. 6  FIG. 7

OPTICALLY SENSITIVE ELECTRIC PAPER

BACKGROUND OF THE INVENTION

A "twisting ball" sheet medium for displaying an image wherein light falling on the medium, under an applied voltage, forces internal bichromal balls to rotate to show either the white or black side.

U.S. Pat. Nos. 4,126,854 and 4,143,103 describe a twisting ball display and are incorporated by reference herein. These patents describe a display system in which the display panel is comprised of spherical particles, balls, which have an optical and electric anisotropy due to each hemisphere surface having a different color and electrical charge. These particles are imbedded in a solid substrate and a slight space between each ball and the substrate is filled with a fluid so that the balls are free to rotate, in a changing electrical field, but can not migrate from one location to another. If one hemisphere is black and the other white, each pixel can be turned on or off by the electrical field applied to that location. Each pixel can be individually addressed by applying an electrical field that is greater than the threshold field required for ball rotation, and a full page image can thus be generated.

This medium is fabricated by first mixing a large number of balls into a solid substrate, curing the substrate, and then soaking the resultant substrate in a plasticizer. The substrate will swell, creating a space around each ball, and the space will fill with the liquid plasticizer, thus allowing each ball to rotate under the effect of an applied electrical field. The result is reusable "electric paper" which can be used, for example, in a raster output scanner, to produce an image from a bit map of electrical fields, or can be used as the flat panel display of a terminal or notebook computer.

It would be useful if this substrate could be modified to produce images from exposure to electromagnetic radiation images, either visible light or x-rays. One way of accomplishing this would be to create a sandwich structure in which this substrate is placed adjacent to a photoconductor layer, with radiation transparent electrodes at the distal surfaces. Upon complete exposure of an area of the photoconductor layer the fraction of the voltage that was across that layer would be collapsed onto the adjacent area of the twisting ball substrate, so that the entire voltage across the sandwich structure would now be across this area of substrate. If this voltage now exceeds the threshold voltage the bichromal balls in that area will rotate.

The problem is that typical threshold switching behavior requires that the photoconductor layer and the substrate have about the same capacitance, which is proportional to the dielectric constant of the layer divided by the actual thickness of the layer. The substrate material has a dielectric constant of about 2.75 and a photoconductor like selenium has a dielectric constant of about 6. This means that if we use a selenium photoconductor to address our twisting ball substrate it must be about twice as thick as the twisting ball substrate. For a twisting ball substrate using 100 micron diameter balls we will have a minimum thickness of about 150 microns. A 300 micron thick photoconductor suitable for addressing the twisting ball display is very thick and expensive and generally not desireable.

It would be useful, then, to photosensitive the twisting ball display in a more desireable manner. In doing this in the manner of this invention we will find other desireable properties that have further value.

SUMMARY OF THE INVENTION

This invention allows the sheet medium to display a light image by using a first uniform electrical field to reset all of the balls to one state, and then applying a light image, sometimes in the presence of a second electrical field, to produce the recorded image. One hemisphere in this case must have an electrical property that can be modified by light, so that a radiated ball will behave differently than one receiving no light. For example, if material properties are such that an irradiated ball has a reduced dipole moment relative to a non-irradiated ball, and if the second electrical field is not strong enough to rotate an irradiated ball yet strong enough to rotate a non-irradiated ball, an image can be produced. Conversely, if an irradiated ball has a stronger dipole moment that an non-irradiated ball, a similar process will rotate the irradiated balls. Furthermore, if the dipole moment of an irradiated ball is of the opposite sign from that of the non-irradiated balls, the need for a threshold mechanism is eliminated as a field of uniform magnitude and constant direction will suffice to form an image. In this last case several distinct advantages accrue. The operator can watch the recorded image develop with continued exposure and stop the exposure when the desired image density is obtained. The electrical field across the structure, and thus across the photosensitive balls, can be made sufficiently large that high photosensitivity can be obtained.

A characteristic of the resultant display is that it is a stable image that requires no additional power for as long as it does not change, as compared to a typical LCD (liquid crystal display) that must be refreshed up to 30 times per second. Thus, a notebook computer equipped with this display would required a fraction of the battery power, which is the main component of the weight of a notebook computer.

An example of the imaging process would be for the system, under the influence of the first electrical field, to align all of the balls in the same polarity, so their photosensitive hemispheres could receive image radiation. After this exposure a second uniform electrical field would be applied, and under the influence of this field the balls that underwent sufficient changes in their electrical properties would overcome the stiction forces that normally bind them to their cavity walls and would rotate. Balls that received less than the threshold exposure would remain in their previous orientations. Hence, exposed balls would present their white hemispheres to a viewer while the unexposed balls would remain black. It should be noted that the reverse side of the display would present the negative to this image.

BRIEF DESCRIPTION OF THE DRAWINGS

FIG. 4 is a diagram of the charges on a ball having a conducting white hemisphere after radiation and field reversal.

FIG. 5 is a diagram of the charges on a ball having an insulating white hemisphere in the initial electric field.

FIG. 6 is a diagram of the charges on a ball having an insulating white hemisphere after radiation.

FIG. 7 is a diagram of the charges on a ball having an insulating white hemisphere after radiation and field reversal.

DETAILED DESCRIPTION OF THE INVENTION

Figure 1:
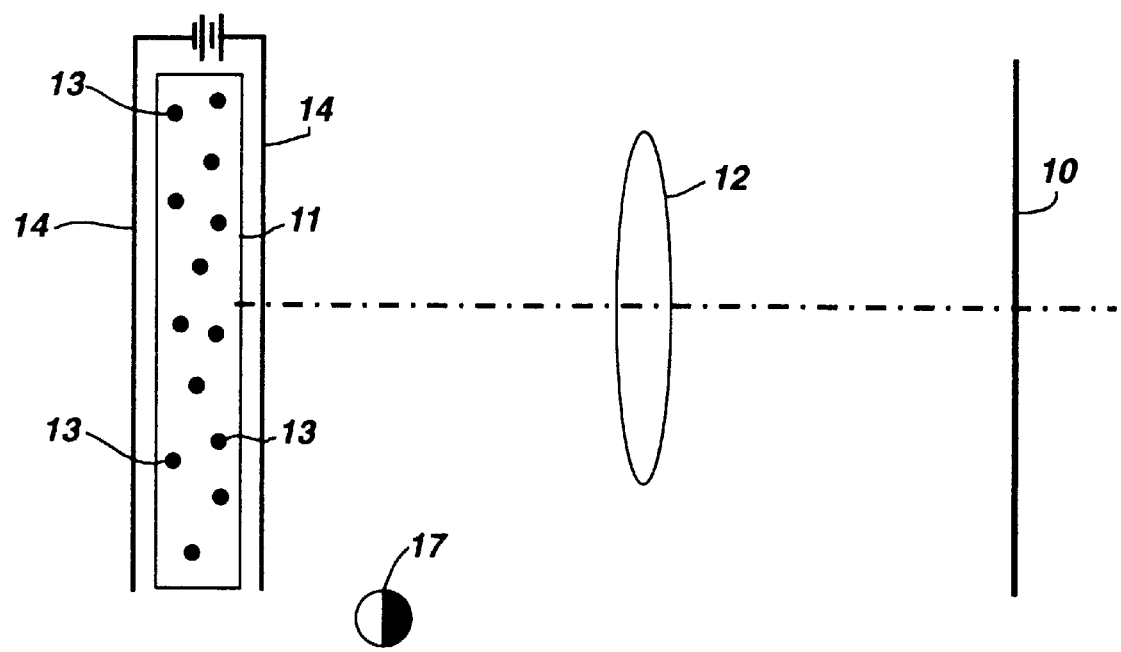
FIG. 1 is a simplified view of the locations of the light source, lens, electric field and electric paper.
Figure 2:
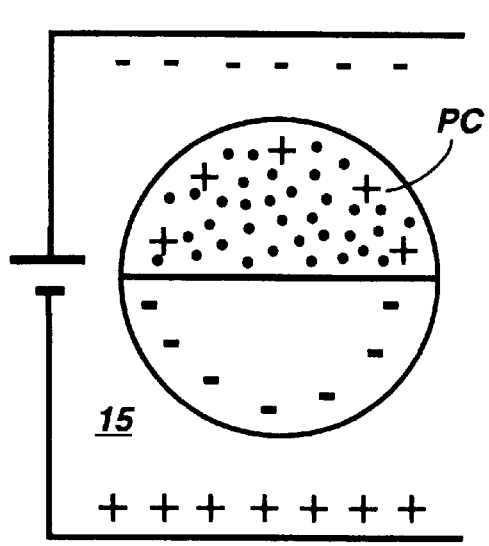
FIG. 2 is a diagram of the charges on a ball having a photoconducting black hemisphere in the initial electric field.
Figure 3:
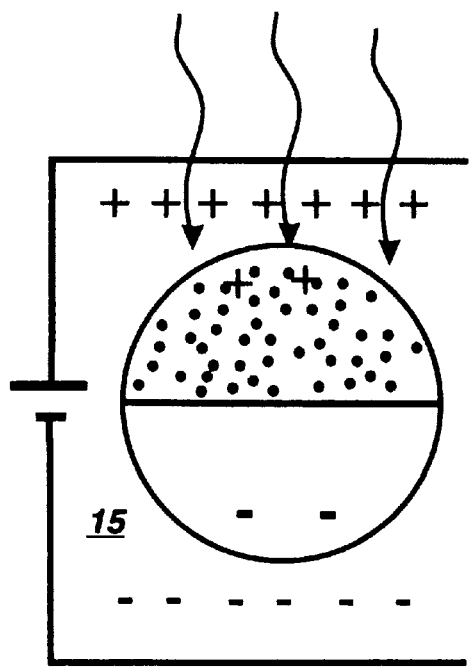
FIG. 3 is a diagram of the charges on a ball having a conducting white hemisphere after radiation.

The use of photosensitive bichromal balls to do optical, or other actinic radiation, image recording is illustrated in FIG. 1. A source of light is generated by element 10 and is focussed on the Electric paper sheet 11 by a lens 12. In the case of X-radiation the lens would not be necessary. The sheet of Electric paper consists of a number of balls 13, one of which is shown as a magnified ball 17. Typically one hemisphere will be made of a white insulative material, such as titanium dioxide dispersed in polyethylene. The other hemisphere will be photosensitive, and of a contrasting color. There are many types of photosensitivity that can be incorporated in the behavior of this hemisphere, but for the purposes of illustration we will limit these to the two major classes of photoconductive and photoinjective behavior.

Because the two hemispheres of the balls are made from different materials, they will develop different double layer characteristics in contact with the dielectric plasticizing liquid (for a good discussion of the double layer reference is made to "Microprocessing and Technology, Asaji Kondo, 1979). Thus in the presense of an electrical field they will develop different values of surface charge density. This behavior has been described in U.S. Pat. No. 4,126,854, U.S. Pat. No. 4,143,103 and U.S. Pat. No. 5,262,098 which are incorporated by reference herein, and is the basis of the dipole behavior exhibited by such bichromal balls.

If one hemisphere of the bichromal ball responds electrically to light exposure the corresponding change in surface charge density will superimpose on the dark surface charge condition, resulting in a change in the electrical behavior of the bichromal ball upon exposure to actinic radiation. Typically, then, to take advantage of this property, a uniform electrical field is applied at the surfaces 14 to orient all of the balls in one direction and then actinic radiation is applied and the field reversed to orient either only the exposed balls or only the unexposed balls in the other direction, producing a stored image. (Depending on the photoresponse of the bichromal ball, the ball rotation upon actinic light exposure may take place without the change in field direction.)

If the bichromal ball is to exhibit photoconductive behavior, there are several general types of structure that will obtain this and that are well known in the art. The entire ball or just the photosensitive hemisphere of the ball may be made from a material, such as PVK (poly-n-vinyl-carbazole) that easily transports photogenerated carriers. It may be sensitized for the actinic radiation by the addition of certain dyes (such as tri-n-nitrol-fluorenone) to make it photoconducting or it may be overcoated by a photogenerating layer, such as selenium that will produce photogenerated carriers that are injected into and conducted by the carrier transporting material. The ball or the photosensitive hemisphere may also be made from an insulative material such as epoxy or polyethylene pigmented by photoconductive materials such as cadmium sulfide. These structures share the common behavior that in the presence of an electrical field and upon exposure to actinic radiation hole/electron pairs are photogenerated and one or both of these will move in the electrical field, changing the charge distribution of the bichromal ball.

In the case where X-Ray images are to recorded, the photoconductor will typically be made from elements having high atomic number. Thus selenium and lead oxide are widely used photoconductors for this purpose.

A less well known but very suitable photosensitive process utilizes the photoinjection of carriers from a photoconductor, such as selenium, into a surrounding dielectric liquid. Thus if one hemisphere of a bichromal ball made from insulative material is coated with a thin selenium layer (by evaporation, for example) it will exhibit this behavior. In the presense of an electrical field and upon exposure to actinic light photogenerated carriers will be injected into the plasticizing liquid from the selenium and will be transported away from the surface, leaving it with a net charge.

Another photosensitive mechanism is derived from the surface photoeffect. Many semiconductor materials exhibit a charge redistribution upon exposure to actinic light as charges trapped near the surface are driven into the bulk of the material. The re-distribution of charge results in a measureable change in the electrostatic potential at the surface. This change is known as the surface photovoltage. This change in surface potential also results in a change in dipole moment. For example, titanium dioxide has been observed to change its surface potential by several volts upon exposure to modest light levels. This material is particularly interesting because it is also a white pigment. Thus one side of a bichromal ball which contains such a pigment will also have an intrinsically photosensitive dipole moment.

The photoresponsive rotation of the bichromal balls depends upon the structure of the balls. The balls are generally contained within spherical cavities filled with dielectric liquid. Upon the application of an electrical field they will both rotate as a dipole and translate as a monopole. The dipole behavior depends upon the difference in surface charge between the two hemispheres of the balls. The monopole behavior depends upon the sum of the surface charges. Thus, equal positive and negative charges on the hemispheres will create a dipole with resulting rotation in a uniform electrical field, but there will be no monopole and thus no linear motion. Most commonly there is both a dipole and a monopole behavior. The monopole behavior drives the ball into the cavity wall where intimate contact allows van der Wahl and other forces to operate and create an adhesion of the ball to the wall. This creates a threshold behavior. Voltages applied to the bichromal ball below a certain value will not cause rotation whereas voltages above a certain value will. Generally, smaller balls require lower voltages to rotate.

These forces determine the algorithim of voltages that must be applied to a sheet of photosensitive Electric Paper to record an image. Typically, for a sheet of Electric Paper containing a monolayer of bichromal balls with an average diameter of 80 microns, 50 volts will be applied to both orient the balls in a common direction and to provide the necessary electrical field to photosensitize the balls.

In the case of photoconductor type of photosensitivity, exposure will take place while this voltage is applied. Positive carriers will move toward the negative addressing electrode, toward which the hemisphere which was initially charged positively was already facing, thus increasing the positive charge at this hemisphere. Likewise, the negative carriers will move toward the side facing the positive addressing electrode. Upon reaching this new distribution, some of the charge carriers will become trapped at their respective surfaces by any of various well-known trapping mechanisms. This trapped charge will persist for some time after the radiation is removed. In this manner, exposure of the bichromal ball to actinic radiation will increase the dipole moment of the ball. If, after radiation is removed, the uniform addressing field is reversed, its magnitude can be decreased to such a value that only the bichromal balls which have been exposed to a certain level of actinic radiation will rotate.

Grey scale response can be obtained by using bichromal balls with a range of diameters, or balls with a range of photoconductive response. (Smaller bichromal balls will rotate at lower threshold voltages, in general.)

In the case of the photoinjection type of photosensitivity, a somewhat different type of behavior can obtain. Once again, the bichromal balls will be aligned by the uniform external field and while this voltage continues to be applied the actinic radiation exposure will take place. If the (typically) selenium coated hemisphere is also the initially positively charged hemisphere the same behavior as described above will obtain. If, however, this is the initially negatively charged hemisphere, the photoinjection of negative charges into the plasticizing liquid will cause the charge on this hemisphere to decrease and eventually become positive. Hence the bichromal balls might rotate after a given exposure without a reversal in the field; simply after sufficient exposure.

It should be noted that the two hemispheres of the bichromal balls could each have photosensitive properties. If one had ordinary photoconductor properties and the other had the photoinjection type of property described in the latter half of the above paragraph, both sequential exposure to two different images and simultaneous exposure to two images received through the two sides of the display would result in a recorded image that was the pixel by pixel difference of the two input images. This property is useful for such applications as change detection.

Figure 8:
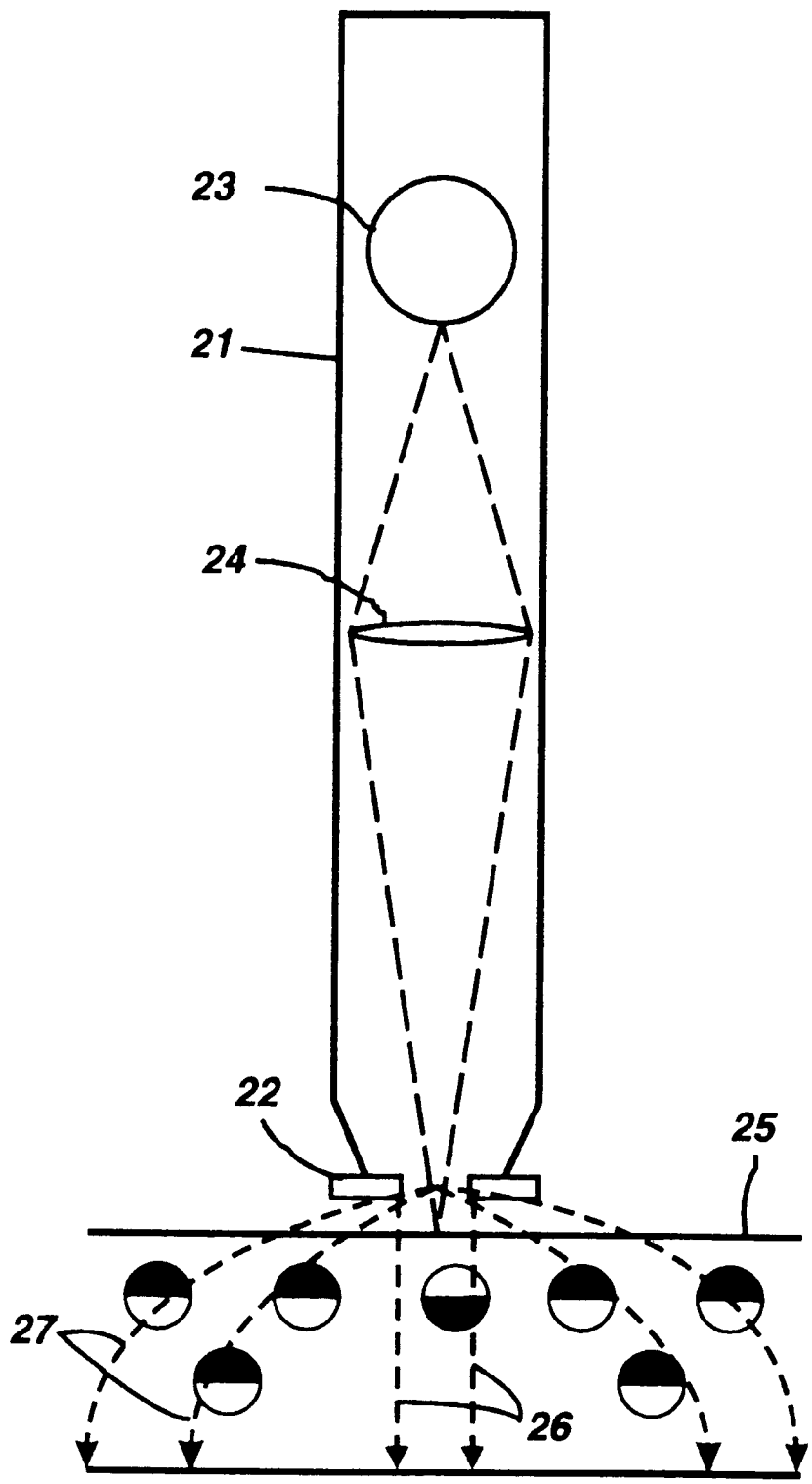
FIG. 8 is an embodiment which uses a stylus to write an image in the form of a line on the medium.

In another embodiment of the invention, a stylus is used to write an image on the display medium. This embodiment is shown in FIG. 8. The stylus 21 contains an electrode 22 at its tip for applying the electric field to the medium 25. This field is applied only in the region of the stylus, and is thus used to alter the image in that region, and would be used in a manner similar to that of a conventional pen writing on a piece of paper. It is an unavoidable fact that such an electrode will exhibit a fringe field extending around the stylus. Although the field directly below the stylus 26 has a direction which is substantially normal to the plane of the paper, the fringe field 27 necessarily has a direction away from the normal, and is thus undesirable as it will cause improper rotation of balls. However, the ill effects of the fringe field can be avoided by the use of photosensitive balls. By use of a suitable radiation source 23 within the stylus, a spot of light can be projected via suitable optical means 24 onto the medium directly below the electrode, at which point the field has the proper orientation. In this manner, only balls in the presence of a desirable field direction will have their dipole moment enhanced in such a way as to cause rotation. Balls in the fringe areas will not be exposed to radiation and, hence, will not rotate. This method requires a suitable mechanism for photosensitivity by which exposed balls have enhanced dipole moments, and by which this enhancement decays sufficiently quickly upon removal of the radiation source.

Figure 9:
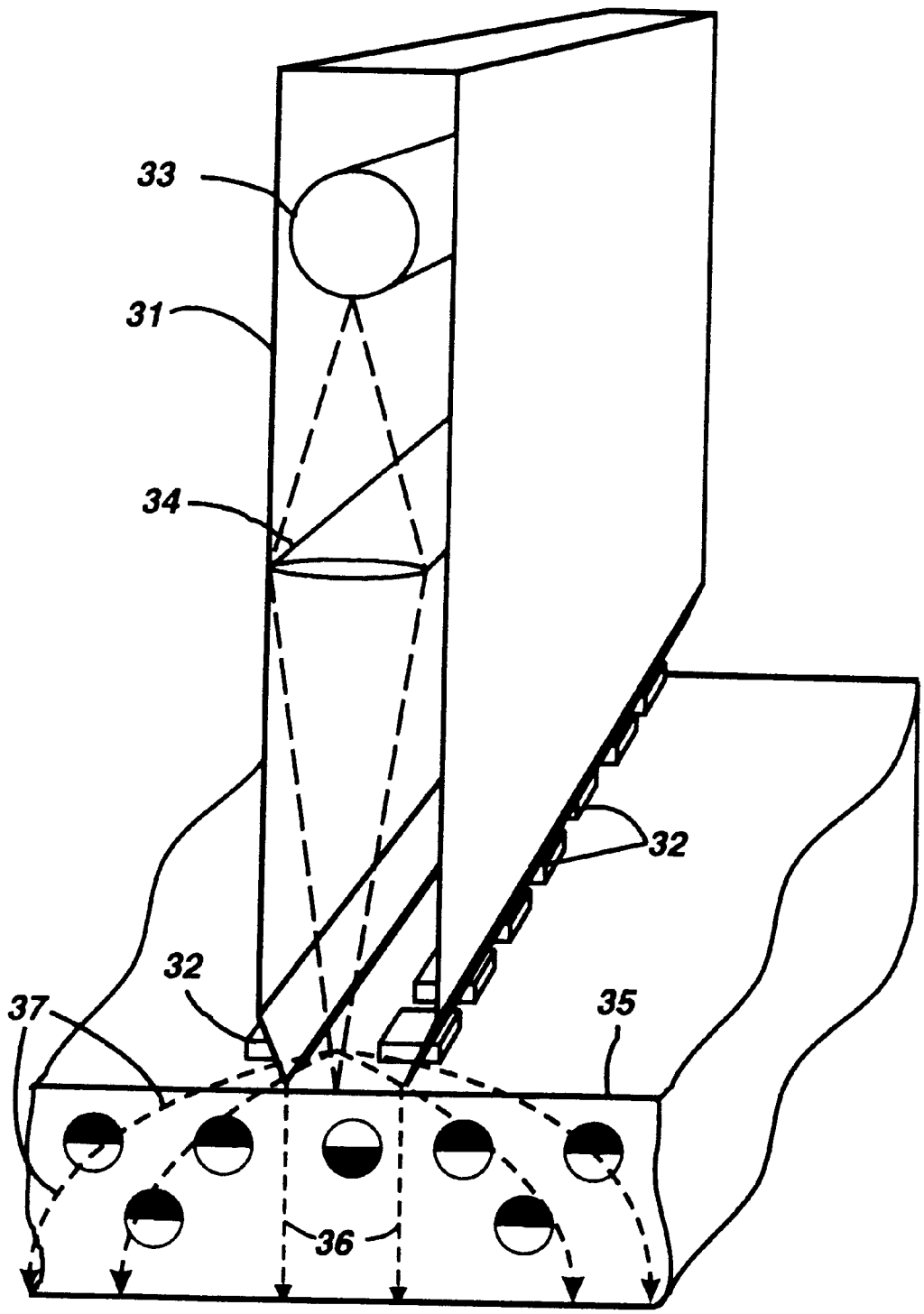
FIG. 9 is an embodiment which uses a stylus to write an image in the form of a series of linear elements on the medium.

FIG. 9 shows an extension of this idea to a writing method using an automated scan bar which is moved across the medium. In this embodiment, the scan bar 31 contains an extended light source 33, with suitable focusing means 34. The electrode array 32 is then driven by suitable electronics in such a manner as to generate one linear element of the desired image. By moving the scan bar across the medium, the complete image is formed.

While the invention has been described with reference to a specific embodiment, it will be understood by those skilled in the art that various changes can be made and equivalents may be substituted for elements thereof without departing from the true spirit and scope of the invention. In addition, many modifications may be made without departing from the essential teachings of the invention.

What is claimed is:

1. Apparatus for generating an image from a light source comprising:
    a light source for generating a light image and
    a display medium comprising,
        a flat substrate having two sides,
        two conductive surfaces, one on each side of said flat substrate,
        a source of electrical voltage connected to said surfaces which can be switched so that one or the other of the surfaces is more positive,
        a plurality of fluid-filled cavities within said substrate, and
        a sphere within each of said cavities, said sphere comprising first and second hemispheres, the surface of the first hemisphere comprising a photoalterable material whose electrical properties are altered by exposure to light, and wherein the second hemisphere is a different color from the first hemisphere.

2. The apparatus of claim 1 wherein said photoalterable material is a photoconductor.

3. The apparatus of claim 1 wherein said photoalterable material is a photoinjector.

4. The apparatus of claim 1 in which said second hemisphere is an insulator.

5. The apparatus of claim 1 in which said second hemisphere is a semiconductor.

6. The apparatus of claim 1 in which said second hemisphere is also a photoalterable material.

7. Apparatus for generating an image from a light source comprising:
    a stylus comprising
        an electrode for generating an electric field, and
        a light source for generating a light beam within said field and
    a display medium comprising,
        a flat substrate having two sides,
        two conductive surfaces, one on each side of said flat substrate,
        a plurality of fluid-filled cavities within said substrate, and
        a sphere within each of said cavities, said sphere comprising first and second hemispheres, the surface of the first hemisphere comprising a photoalterable material whose electrical properties are altered by exposure to light, and wherein the second hemisphere is a different color from the first hemisphere.

8. Apparatus for generating an image from a light source comprising:
    a number of styluses arranged in a row, each comprising
        an electrode for generating an electric field, and
        a light source for generating a light beam within said field, and
    a display medium comprising,
        a flat substrate having two sides,
        two conductive surfaces, one on each side of said flat substrate,
        a plurality of fluid-filled cavities within said substrate, and a sphere within each of said cavities, said sphere comprising first and second hemispheres, the surface of the first hemisphere comprising a photoalterable material whose electrical properties are altered by exposure to light, and wherein the second hemisphere is a different color from the first hemisphere.

* * * * *